No. 657,712. Patented Sept. 11, 1900.
G. H. THOMAS.
COMBINED UNION AND ELBOW FOR COUPLING PIPES.
(Application filed July 17, 1900.)
(No Model.)
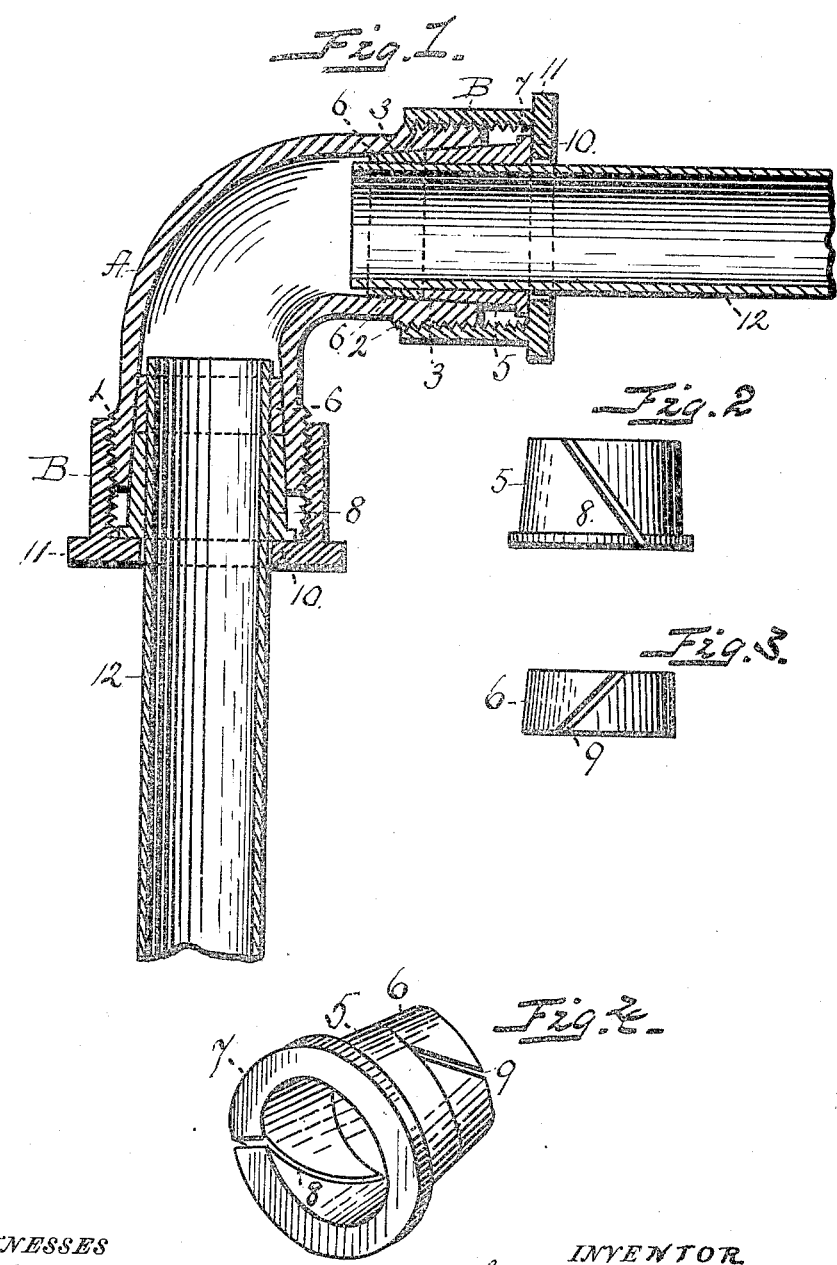
WITNESSES
INVENTOR
George H. Thomas,
Attorney.

UNITED STATES PATENT OFFICE.

GEORGE H. THOMAS, OF WASHINGTON, DISTRICT OF COLUMBIA, ASSIGNOR OF ONE-HALF TO HARRY E. MORAN, OF SAME PLACE.

COMBINED UNION AND ELBOW FOR COUPLING PIPES.

SPECIFICATION forming part of Letters Patent No. 657,712, dated September 11, 1900.

Application filed July 17, 1900. Serial No. 23,935. (No model.)

*To all whom it may concern:*

Be it known that I, GEORGE H. THOMAS, a citizen of the United States of America, residing in Washington, in the District of Columbia, have invented a new and useful Improvement in a Combined Union and Elbow for Coupling Pipes, of which the following is a specification.

My invention has relation to improvements in a combined union and elbow for coupling pipes; and one object is to provide simplified means for securing the approaching ends of steam or water pipes in an elbow connection whereby a steam or water tight joint is made without the interposition of the usual soft-metal bushing or composite packings.

A further object is to provide a pipe connection of the kind intended which is readily applied, speedily adjusted, and which may be as conveniently detached.

With these objects in view the invention consists in the combination, with an elbow pipe-coupling and pipes in the ends thereof, of metal bushing or clamping rings exteriorly tapered and diagonally slitted arranged in the coupling and surrounding the inserted pipes and adjusting and coupling nuts or caps to push the clamping-rings inwardly and clamp the parts together.

The invention further consists in the novel construction of parts and their combination, as will hereinafter be fully disclosed, and the novelty therefore particularly pointed out in the claims.

I have fully and clearly illustrated the invention in the accompanying drawings, to be taken as a part hereof, and wherein—

Figure 1 is a central sectional view through the device, showing the attached pipes in position. Fig. 2 is a detail view of the outer or main clamping ring or sleeve. Fig. 3 is a detail view of the inner and shorter clamping-ring. Fig. 4 is a detail perspective showing the preferred arrangement of the clamping rings or sleeves.

Referring to the drawings, A designates the bent or elbow coupling-section of the usual exterior conformation and provided with exterior screw-threaded ends 1 2. This coupling-section A is bored out at each end, the bores or openings being tapered from the mouth of the respective ends inward, as at 3 3, to afford tapering seats for the respective clamping-rings. In the tapering seats thus provided are seated the packing and pipe-clamping rings, collars, or sleeves 5 6, the latter of which consists of a metal band or ring having a smooth straight interior surface or bore and a tapering exterior surface alining with the tapering seats formed in the ends of the coupling section or piece and adapted to fit therein at or adjacent to the lower end portion of the seats. The ring or collar 5 constitutes the outer or main clamping device for the pipe ends extending into the bent section, as shown. The bore of this ring 5 is straight and smooth, and the exterior is tapered to fit the tapered seats in the ends of the bent section. This ring 5 is made longer than the inner rings 6 and has formed about its outer end an annular flange 7 to strengthen it and provide an extended surface for the impact of the clamping nuts or caps. Both the rings 5 and 6 are slit diagonally from end to end, as at 8 9, the slits forming slots which provide a limited expansion and contraction when applied to the pipe ends and so that they may have endwise movement when being forced into clamping position. It will be perceived that a single tapering ring or sleeve slotted throughout its length would serve the purpose intended; but because of leakage of steam or fluid through a continuous slit or slot in a single ring I prefer to use the two rings and place them with the slots opposite to each other, as indicated in Fig. 4 of the drawings, whereby communication is stopped and all leakage prevented.

B B designate the coupling and clamping nuts or caps, consisting of a cylindrical sleeve having interior screw-threads to engage in those of the screw-threaded ends of the bent section or elbow and having an inner annular shoulder or flange 10 surrounding the pipe-hole, which fits slidingly over the pipe 12, to be secured in the bent section. The outer end of the clamping nuts or caps may be formed with an angular collar 11 to engage a wrench when fitting and coupling the parts.

It will be perceived from the foregoing description, taken in connection with the drawings, that all the parts are of the simplest construction, that they are easily fitted in position and readily secured together, that when so secured they present a strong, tight, and reliable joint, and that when desired the parts can be conveniently separated and detached.

The parts are assembled and the union or couple effected by slipping the clamping-nut over the pipe to be coupled to the elbow, then placing the clamping-rings in their seat in the elbow, then placing the end of the pipe in the clamping-rings, and then screwing up the clamping nut or cap until the parts are rigid and secure.

It is apparent that a pipe-coupling of the general construction shown may be applied to and utilized in coupling or connecting pipes laid in the same straight line of direction.

What I claim is—

1. In a pipe-coupling, the combination with approaching ends of pipes, of a bent pipe-section provided with exterior screw-threads on its ends and formed with interior tapering clamping-ring seats, tapering clamping-rings having diagonal slots extending from end to end, seated in the said ring-seats, and clamping nuts or caps having interior screw-threads to engage the threaded ends of the bent pipe-section and push the clamping-rings into the tapered seats and clamp the pipes to the bent section, substantially as set forth.

2. In a pipe-coupling, the combination of a bent pipe-section provided with exterior screw-threads on its ends and formed with interior tapering clamping-ring seats, a slotted and tapering clamping-ring seated at the lower end portion of each ring-seat, a slotted outer tapering clamping-ring seated in the outer portion of said seats with its inner end abutting the outer end of the inner clamping-ring, said rings being diagonally slotted from end to end, pipes arranged in the clamping-rings, and clamping nuts or caps on the pipes formed with interior screw-threads to engage the threaded ends of the bent pipe-section and push the clamping-rings into clamping relation on the parts, substantially as set forth.

3. In a pipe-coupling, the combination of a bent pipe-section provided with exterior screw-threads on its ends and formed with interior tapering clamping-ring seats, a tapering clamping-ring seated at the lower end portion of each ring-seat and provided with a diagonal slot extending from end to end thereof, a tapering clamping-ring seated in the outer portion of said seats with its inner end abutting the outer end of the inner clamping-ring, and formed with a diagonal slot extending from end to end thereof, said rings being arranged in their seats with the diagonal slots opposite to each other, and clamping nuts or caps on the pipes formed with interior screw-threads to engage the threaded ends of the bent pipe-section and push the clamping-rings into clamping relation on the parts, substantially as set forth.

4. In a pipe-coupling, the combination of a coupling-piece provided with exterior screw-threads on its end and formed with an interior tapering clamping-ring seat, a clamping-ring having a tapered exterior and slotted from end to end, seated in the inner end portion of said ring-seat, a clamping-ring slotted from end to end and arranged in the outer end portion of the said ring-seat with its inner end abutting the outer end of the inner clamping-ring, a pipe in the clamping-rings, and a clamping nut or cap on the pipe formed with interior screw-threads to engage the screw-threads of the coupling-piece and push the clamping-rings endwise to clamp the pipe, substantially as described.

GEORGE H. THOMAS.

Witnesses:
F. WARREN JOHNSON,
WILLIAM HOARE.